United States Patent [19]

Spencer

[11] Patent Number: 5,203,202
[45] Date of Patent: Apr. 20, 1993

[54] APPARATUS FOR DETECTING LEAKS IN CIRCUITS

[75] Inventor: Mark Spencer, Phoenix, Ariz.

[73] Assignee: W. L. Gore & Associates, Inc., Newark, Del.

[21] Appl. No.: 841,135

[22] Filed: Feb. 25, 1992

[51] Int. Cl.⁵ .................... G01M 3/04; G01M 3/14
[52] U.S. Cl. .................................. 73/40.5 R; 73/40
[58] Field of Search ............... 73/40.5 R, 40; 324/534

[56] References Cited

U.S. PATENT DOCUMENTS

| 3,981,181 | 9/1976 | Ochiai | 73/40.5 R |
|---|---|---|---|
| 4,029,889 | 6/1977 | Mizuochi | 324/534 |
| 4,112,417 | 9/1978 | Himeno | 73/40.5 R |
| 4,206,632 | 6/1980 | Suzuki | 73/40.5 R |
| 4,288,654 | 9/1981 | Blom et al. | 73/40.5 R |
| 4,570,477 | 2/1986 | Sugibuchi | 73/40.5 R |
| 4,877,923 | 10/1989 | Sahakian | 73/40.5 R |
| 4,896,527 | 1/1990 | Akiba | 73/40.5 R |
| 4,910,998 | 3/1990 | Willis et al. | 73/40.5 R |
| 4,926,165 | 5/1990 | Lahlouh et al. | 73/40 |
| 5,017,908 | 5/1991 | Macpherson | 73/40.5 R |
| 5,146,778 | 9/1992 | Hsu | 73/40.5 R |

Primary Examiner—Hezron E. Williams
Assistant Examiner—George M. Dombroske
Attorney, Agent, or Firm—Gary A. Samuels

[57] ABSTRACT

A leak detection assembly that employs a layer of pliable conductive construction between a fluid conduit or tube and a tape containing signal carrying elements disposed along the length of the tape. The signal carrying element can be a series of parallel electrical conductors disposed longitudinally.

3 Claims, 2 Drawing Sheets

FIG. 1A
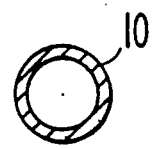
FIG. 1B
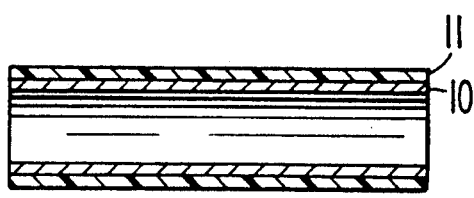
FIG. 2A
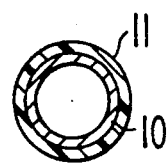
FIG. 2B
FIG. 3
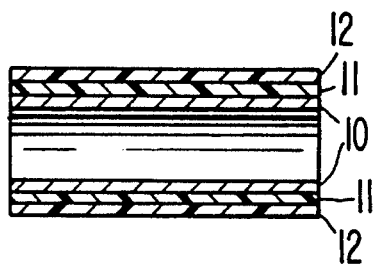
FIG. 4A
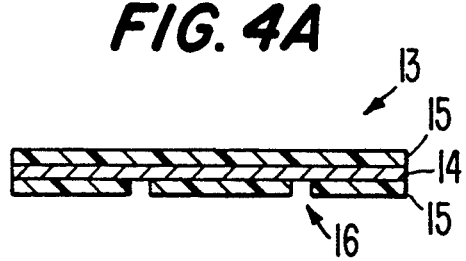
FIG. 4B
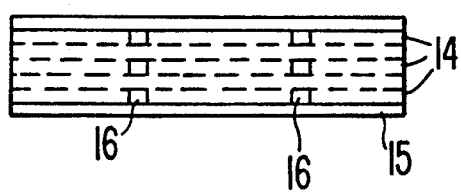

APPARATUS FOR DETECTING LEAKS IN CIRCUITS

FIELD OF THE INVENTION

This invention relates to the detection of leaks from inside pressurized conduits, such as pipes or hoses. More specifically it utilizes a change in the impedance between conductors to detect leaks.

BACKGROUND OF THE INVENTION

Fluid leaks, such as gaseous leaks, from conduits or lines, i.e. pipes or hoses, transporting high pressure fluids can be unsafe, dangerous to the environment, and costly. There is a need for the detection of leaks in such conduits over their entire length.

A common method of detecting leaks in pressurized conduits is based on point probes which continually monitor for fluid or which register vibrational changes in the conduit. For detecting leaks along a long length of pipe or hose, the large number of required point probes makes these methods impractical.

SUMMARY OF THE INVENTION

This invention employs a layer of pliable conductive material between a conduit and signal carrying elements disposed along the length of the conduit. The signal carrying elements comprise a series of at least two insulated parallel electrical conductors disposed longitudinally along the conduit in which adjacent portions of the conductors are exposed along the side next to the pliable conductive material. Preferably the parallel conductors are embedded in a ribbon tape.

The pliable conductive material is a layer of conductive tape wrapped around the conduit. The pliable material can be a carbon loaded polymer such as carbon loaded polyester, silicone or tetrafluoroethylene tape.

Upon leakage of gas from the pressurized gas conduit, there will be a momentary ballooning of the conductive pliable layer, which upon contact with the exposed portion of the signal carrying elements, alters the resistance between said conductors making up the signal carrying elements. This change is measured directly by impedance changes.

BRIEF DESCRIPTION OF THE DRAWINGS

FIG. 1a and b depict a cutaway side view and end view of a conduit.

FIG. 2a and b depict the cutaway conduit and end view with a layer of insulation around it.

FIG. 3 depicts the cutaway conduit of FIG. 2 with a pliable conductive material around it.

FIG. 4a and b depict a ribbon cable used to wrap around the construction of FIG. 3.

FIG. 4a is a side view and

FIG. 4b is a top view of the ribbon cable.

DESCRIPTION OF THE INVENTION

Figure 5:
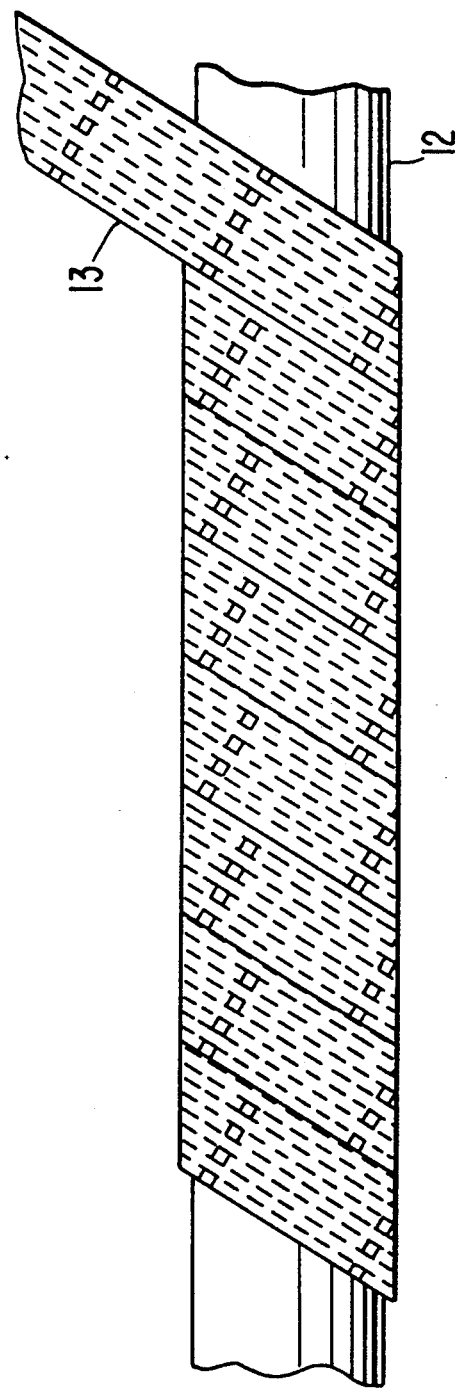
FIG. 5 shows the ribbon able wrapped around the construction of FIG. 3.

The invention will now be described in detail with reference to the drawings, and with reference to gas as the fluid.

In FIG. 1, the pipe or conduit 10, which can be made of metal, such as steel, or plastic, carries the gas, which can be any gas transportable through a gas conduit, for example, hydrocarbon gases, hydrogen, or hydrogen gas permeable sulfide gases. Gas permeable insulation 11 may surround conduit 10 (FIG. 2), but is not necessary. A pliable conductive material 12 such as carbon-loaded, expanded porous PTFE film is positioned around the insulated conduit (FIG. 3).

Located around the pliable conductive material are elongated signal conductor elements 14, such as copper wire. Referring to FIG. 4, the parallel conductor elements or wires 14 are most conveniently applied around the conduit by first embedding them in plastic insulation 15 to form a ribbon of plastic tape 13 having the conductor wires inside. At spaced intervals along the tape 13, the insulation has sections 16 cutaway transversely across the width of the tape to form gaps of exposed bare conductor wire. This tape is then wrapped around the conduit having the pliable conductive material on it as shown in FIG. 5 with the cutaway sections 1b adjacent the pliable material 12.

In operation, a break or hole in the pipe or conduit 10 causes pressure to build under the pliable conductive material 12 forcing it to expand, which in turn causes the pliable conductive material 12 to contact bare conductor elements 14 at cutaway gaps 16. The resulting change in resistance shows up in impedance which is recorded and which signifies that gas is escaping from the pipe or hose at that point. The pliable conductive material 12 should be slightly gas permeable thus allowing gas to escape but maintaining the ballooning effect. This gas permeability prevents the "balloon" from immediately bursting.

The entire assembly is then ordinarily covered by a protective jacket (not shown) which can be polyester, polyimide, polyurethane, or any type of tough protective covering.

While the invention has been described with respect to use of ribbon cable 13, it is understood that adjacent bare conductive wires can be wrapped around the conduit construction of FIG. 3. Use of ribbon cable is for convenience of assembly and for convenience in protecting the wires from displacement as the cable assembly is placed into operation.

Gas permeable insulation 11 can be any insulation. A convenient such insulation is a layer or tape of expanded, porous polytetrafluoroethylene (PTFE) which has a low dielectric constant and which comprises open micropores that allow passage of gas. A conductive form (e.g. carbon filled) of the same type of expanded porous PTFE is conveniently sues for pliable conductive material 12. The ribbon cable is preferably composed of copper wire embedded in a polyester tape. Both insulation 11 and pliable material 12 are conveniently applied by wrapping tape around the conduit, or by adding both to the plastic tape 14 in sequence and then wrapping this tape around the conduit.

As explained above, a leak in the conduit is detected when the pliable conductive material balloons out and contacts the exposed bare conductor elements at 16. This contact alters the resistance between conductor elements 14 and is measurable directly or by measuring impedance or capacitance changes. Electrical pulses are sent down the conductors 14 and the cable monitored for reflections (i.e., return energy from the incident pulses). Time domain reflectometry (TDR) is generally used to determine both the occurrance and the location of a leak.

EXAMPLE

A copper pipe, ½ inch in diameter, having one 0.030 inch diameter hole drilled through one wall at approximately 2 ft. in from the end was used. Conductive carbon loaded (25%) by weight expanded porous PTFE (obtained from W. L. Gore & Assoc., Inc.) was wrapped around the pipe such that each wrap overlapped approximately 50% of the previous wrap. This wrapped layer started at 1 ft. in from the air inlet end and was approx. 2 ft. long. Over this was wrapped a layer of polyester flat conductor cable tape having a ½ inch width. Four electrical conductors approximately 0.080 inch wide and 0.050 inch distance between conductors were embedded in the tape which was made of 0.005 inch thick polyester insulation. Perpendicular to the longitudinal axis of the flat cable at ½ inch intervals, the conductors were exposed by cutting away the polyester.

The flat conductor cable was wrapped around the pipe over the carbon loaded film with the exposed conductor portions facing the inside and each wrap overlapping the previous wrap by approximately 0.050 inches.

Measurements were made by time domain reflectance (TDR).

Air pressure of 110 psi was introduced into the pipe via a fitting at the inlet end. The TDR trace began to fall in the area of the drilled hole. When pressure was released, the TDR trace recovered. Pressure was then reintroduced through a pressure regulator. The TDR trace began to drop in the area of the drilled hole at approximately 30 psi and progressively dropped with the increase of pressure.

I claim:

1. A fluid carrying conduit equipped for leak detection, which comprises a conduit surrounded around its circumference with a pliable fluid permeable conductive material, and which has a series of parallel insulated electrical conductors disposed generally longitudinally along the conduit and wrapped around the outside of said pliable conductive material, said insulated electrical conductors having bare conductor elements exposed at adjacent areas of insulated conductor material on the side of the insulated conductor material that is adjacent the pliable conductive material wherein the conductive material is adapted to be expanded by the pressure of leaking fluid and thereby contact the conductor elements at adjacent exposed areas.

2. The conduit of claim 1 wherein the pliable fluid permeable conductive material is a conductive polymeric material.

3. The conduit of claim 1 wherein the series of parallel insulated electrical conductors are constructed in the form of a ribbon cable having at least two parallel conductor elements embedded in the cable.

* * * * *